(12) United States Patent
Criminisi et al.

(10) Patent No.: US 8,867,802 B2
(45) Date of Patent: Oct. 21, 2014

(54) AUTOMATIC ORGAN LOCALIZATION

(75) Inventors: Antonio Criminisi, Cambridge (GB); Jamie Daniel Joseph Shotton, Cambridge (GB); Duncan Paul Robertson, Cambridge (GB); Sayan D. Pathak, Kirkland, WA (US); Steven James White, Seattle, WA (US); Khan Mohammed Siddiqui, Highland, MD (US)

(73) Assignee: Microsoft Corporation, Redmond, WA (US)

( * ) Notice: Subject to any disclaimer, the term of this patent is extended or adjusted under 35 U.S.C. 154(b) by 452 days.

(21) Appl. No.: 13/090,108

(22) Filed: Apr. 19, 2011

(65) Prior Publication Data

US 2012/0269407 A1 Oct. 25, 2012

(51) Int. Cl.
  *G06K 9/00* (2006.01)
  *G06T 7/00* (2006.01)

(52) U.S. Cl.
  CPC ...... *G06T 7/0048* (2013.01); *G06T 2207/20081* (2013.01); *G06T 2207/20076* (2013.01); *G06T 2207/30004* (2013.01); *G06K 2209/051* (2013.01); *G06T 2207/10072* (2013.01)
  USPC ...................................... 382/128

(58) Field of Classification Search
  CPC .............. G06K 2209/051; G06T 2207/10072; G06T 2207/20076; G06T 2207/20081; G06T 2207/30004; G06T 7/0048
  USPC ...................................... 382/128
  See application file for complete search history.

(56) References Cited

U.S. PATENT DOCUMENTS

| | | | | |
|---|---|---|---|---|
| 5,734,384 A | * | 3/1998 | Yanof et al. | 345/424 |
| 6,556,696 B1 | | 4/2003 | Summers et al. | |
| 6,775,405 B1 | * | 8/2004 | Zhu | 382/154 |
| 7,397,937 B2 | | 7/2008 | Schneider et al. | |
| 7,639,896 B2 | * | 12/2009 | Sun et al. | 382/294 |
| 8,064,663 B2 | * | 11/2011 | Van Hoe et al. | 382/128 |
| 2007/0223801 A1 | | 9/2007 | Gundel | |

(Continued)

OTHER PUBLICATIONS

Zheng, et al., "Constrained marginal space learning for efficient 3D anatomical structure detection in medical images", Retrieved at <<http://www.ist.temple.edu/~hbling/publication/ZhengGLZSC09cvpr.pdf>>, IEEE Conference on Computer Vision and Pattern Recognition, Jun. 20-25, 2009, pp. 194-201.

(Continued)

*Primary Examiner* — Tom Y Lu
(74) *Attorney, Agent, or Firm* — Steve Wight; Judy Yee; Micky Minhas (57) ABSTRACT

Automatic organ localization is described. In an example, an organ in a medical image is localized using one or more trained regression trees. Each image element of the medical image is applied to the trained regression trees to compute probability distributions that relate to a distance from each image element to the organ. At least a subset of the probability distributions are selected and aggregated to calculate a localization estimate for the organ. In another example, the regression trees are trained using training images having a pre-defined organ location. At each node of the tree, test parameters are generated that determine which subsequent node each training image element is passed to. This is repeated until each image element reaches a leaf node of the tree. A probability distribution is generated and stored at each leaf node, based on the distance from the leaf node's image elements to the organ.

20 Claims, 7 Drawing Sheets

(56) References Cited

U.S. PATENT DOCUMENTS

| | | |
|---|---|---|
| 2008/0123921 A1 | 5/2008 | Gielen et al. |
| 2008/0159611 A1 | 7/2008 | Tao et al. |
| 2009/0054740 A1* | 2/2009 | Gudmundsson et al. ..... 600/300 |
| 2010/0002928 A1 | 1/2010 | Durgan |
| 2010/0105306 A1 | 4/2010 | Daley et al. |

OTHER PUBLICATIONS

Breiman, Leo, "Random forests", Retrieved at <<http://oz.berkeley.edu/users/breiman/randomforest2001.pdf>>, Jan. 2001, pp. 1-33.

Zhou, et al., "A boosting regression approach to medical anatomy detection", Retrieved at <<http://ieeexplore.ieee.org/stamp/stamp.jsp?tp=&arnumber=4270164>>, IEEE Conference on Computer Vision and Pattern Recognition, Jun. 22-27, 2007 pp. 1-8.

Fenchel, et al., "Automatic labeling of anatomical structures in MR fast view images using a statistical atlas", Retrieved at <<http://www.gris.uni-tuebingen.de/fileadmin/user_upload/Paper/Fenchel-2008-Automatic.pdf>>, In the Proceedings of the 11th international conference on Medical Image Computing and Computer-Assisted Intervention, 2008, p. 8.

Zhou, et al., "Image based regression using boosting method", Retrieved at <<http://www.umiacs.umd.edu/~shaohua/papers/zhou05iccv_ibr.pdf>>, In the Proceedings of the Tenth IEEE International Conference on Computer Vision, 2005, pp. 1-8.

Friedman, Jerome H., "Greedy function approximation: a gradient boosting machine", Retrieved at <21 http://luthuli.cs.uiuc.edu/~daf/courses/Optimization/Papers/2699986.pdf>>, The Annals of Statistics 2001, vol. 29, No. 5, Oct. 2001, pp. 1189-1232.

Yin, et al., "Tree-based classifiers for bilayer video segmentation", Retrieved at <<http://johnwinn.org/Publications/papersiTreeBasedBilayer_Yin_et_al_CVPR2007.pdf>>, IEEE Conference on Computer Vision and Pattern Recognition, Jun. 17-22, 2007, p. 1-8.

Montillo, et al., "Age regression from faces using random forests", Retrieved at <<http://www.ist.temple.edu/~hbling/publication/MontilloL09icip.pdf>>, In the Proceedings of the 16th IEEE international conference on Image processing, 2009, p. 4.

Gall, et al., "Class-specific hough forest for object detection", Retrieved at <<http://www.ski.org/Rehab/Coughlan_lab/General/JournalClub/0618.pdf>>, In Proceedings IEEE Conference Computer Vision and Pattern Recognition, 2009, pp. 1022-1029.

Torralba, et al., "Sharing visual features for multiclass and multiview object detection", Retrieved at <<http://ieeexplore.ieee.org/stamp/stamp.jsp?tp=&arnumber=4135679>>, IEEE Transactions on Pattern Analysis and Machine Intelligence, vol. 29, No. 5,, May 2007, pp. 854-869.

Seifert, et al., "Hierarchical parsing and semantic navigation of full body CT data", Retrieved at <<http://stat.fsu.edu/~abarbu/papers/SPIE08_Seifert_Fullbody_04_08_2008.pdf>>, 2009, p. 4.

Criminisi, et al., "Decision forests with long-range spatial context for organ localization in CT volumes", Retrieved at <<http://research.microsoft.com/pubs/81675/Criminisi_MICCAI_PMMIA_2009.pdf>>, In Medical Image Computing and Computer-Assisted Intervention workshop on Probabilistic Models for Medical Image Analysis, 2009, p. 12.

Isgum, et al., "Multi-atlas-based segmentation with local decision fusion application to cardiac and aortic segmentation in CT scans", Retrieved at <<http://elastix.isi.uu.nl/marius/downloads/2009_i_TMI_a.pdf>>, IEEE Transactions on Medical Imaging, vol. 28, No. 7, Jul. 2009, pp. 1000-1010.

Shotton, et al., "Textonboost for image understanding: Multi-class object recognition and segmentation by jointly modeling texture, layout, and context", Retrieved at <<http://jamie.shotton.org/work/publications/ijcv07a.pdf>>, International Journal of Computer Vision, Jul. 2, 2007, pp. 1-30.

* cited by examiner

AUTOMATIC ORGAN LOCALIZATION

BACKGROUND

Computer-rendered images can be a powerful tool for the analysis of data representing real-world objects, structures and phenomena. For example, detailed images are often produced by medical scanning devices that clinicians can use to help diagnose patients. The devices producing these images include magnetic resonance imaging (MRI), computed tomography (CT), single photon emission computed tomography (SPECT), positron emission tomography (PET) and ultrasound scanners. The images produced by these medical scanning devices can be two-dimensional images or three-dimensional volumetric images. In addition, sequences of two- or three-dimensional images can be produced to give a further temporal dimension to the images.

However, the large quantity of the data contained within such images means that the user can spend a significant amount of time just searching for the relevant part of the image. For example, in the case of a medical scan a clinician can spend a significant amount of time just searching for the relevant part of the body (e.g. heart, kidney, liver, etc.) before looking for certain features (e.g. signs of cancer or anatomical anomalies) that can help a diagnosis.

Some techniques exist for the automatic detection and recognition of objects in images, which can reduce the time spent manually searching an image. For example, geometric methods include template matching and convolution techniques. For medical images, geometrically meaningful features can, for example, be used for the segmentation of the aorta and the airway tree. However, such geometric approaches have problems capturing invariance with respect to deformations (e.g. due to pathologies), changes in viewing geometry (e.g. cropping) and changes in intensity. In addition, they do not generalize to highly deformable structures such as some blood vessels.

Another example is an atlas-based technique. An atlas is a hand-classified image, which is mapped to a subject image by deforming the atlas until it closely resembles the subject. This technique is therefore dependent on the availability of good atlases. In addition, the conceptual simplicity of such algorithms is in contrast to the requirement for accurate, deformable algorithms for registering the atlas with the subject. In medical applications, an issue with n-dimensional registration is in selecting the appropriate number of degrees of freedom of the underlying geometric transformation; especially as it depends on the level of rigidity of each organ/tissue. In addition, the optimal choice of the reference atlas can be complex (e.g. selecting separate atlases for an adult male body, a child, or a woman, each of which can be contrast enhanced or not). Atlas-based techniques can also be computationally inefficient.

The embodiments described below are not limited to implementations which solve any or all of the disadvantages of known image analysis techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Automatic organ localization is described. In an example, an organ in a medical image is localized using one or more trained regression trees. Each image element of the medical image is applied to the trained regression trees to compute probability distributions that relate to a distance from each image element to the organ. At least a subset of the probability distributions are selected and aggregated to calculate a localization estimate for the organ. In another example, the regression trees are trained using training images having a pre-defined organ location. At each node of the tree, test parameters are generated that determine which subsequent node each training image element is passed to. This is repeated until each image element reaches a leaf node of the tree. A probability distribution is generated and stored at each leaf node, based on the distance from the leaf node's image elements to the organ.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a general-purpose computing system, the system described is provided as an example and not a limitation. As those skilled in the art will appreciate, the present examples are suitable for application in a variety of different types of dedicated or embedded computing systems or devices.

The techniques below are described with reference to medical images, which can be a two- or three-dimensional images representing the internal structure of a (human or animal) body, or a sequence of such images (e.g. showing a heart beating). Three-dimensional images are known as volumetric images, and can, in one example, be generated as a plurality of 'slices' or cross-sections captured by a scanner device and combined to form an overall volumetric image. Volumetric images are formed of voxels. A voxel in a 3D volumetric image is analogous to a pixel in a 2D image, and represents a unit of volume.

The term 'image element' is used herein to refer to a pixel in a two dimensional image, a voxel in a three or higher dimensional image or time varying sequence of images, or groups of pixels or voxels such as clusters, patches, or other collections of two or more pixels or voxels. Each image element has one or more values associated with it. Each value represents a property such as intensity or color. The property can depend on the type of medical image device generating the image. In an example, the image intensities can be related to the density of the tissue at a given portion of the image or the proportion of water present in the material. Medical image scanners are calibrated so that the image elements have physical sizes (e.g. the voxels or pixels are known to have a certain size in millimeters).

Figure 1:
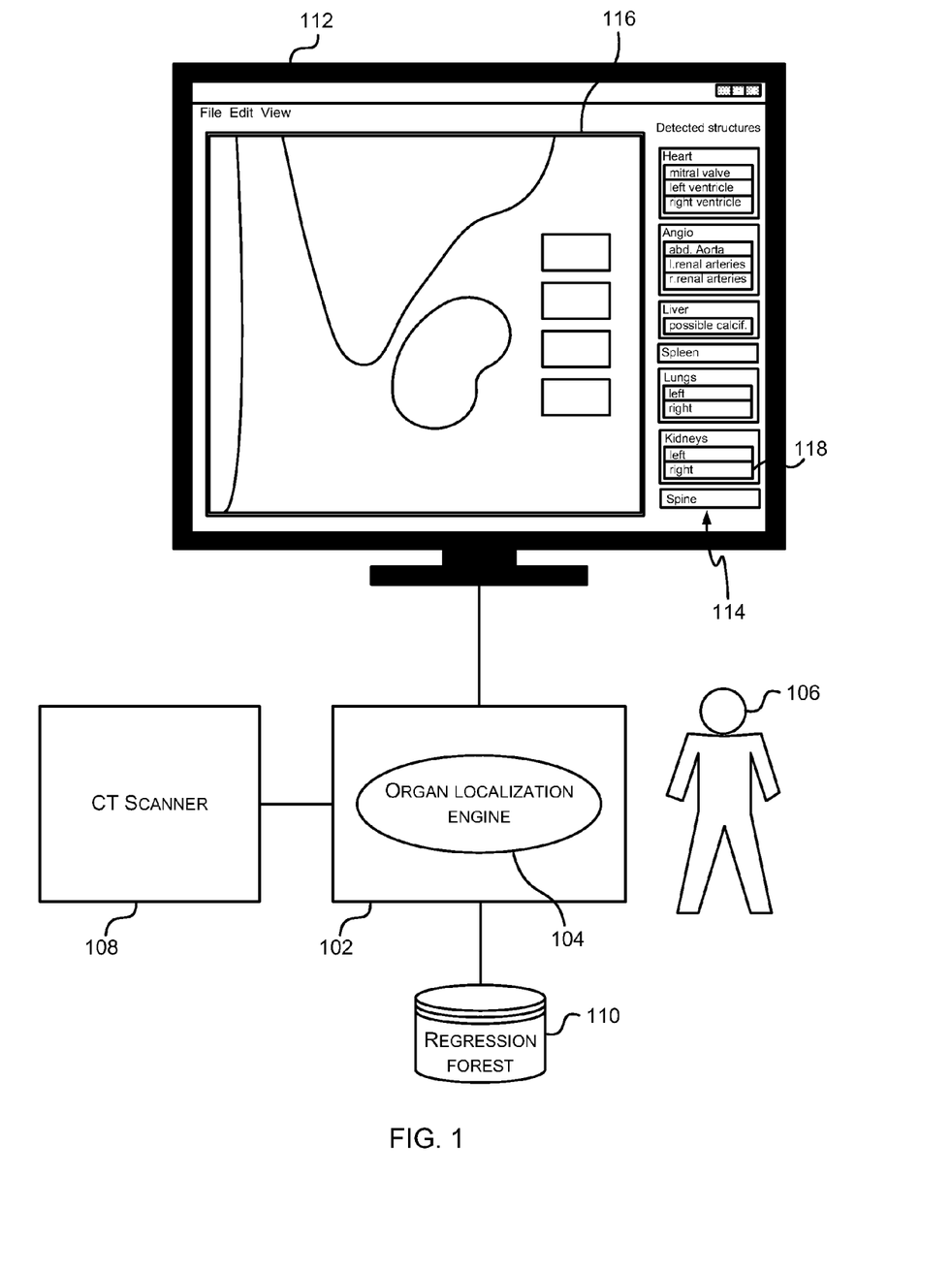
FIG. 1 illustrates a schematic diagram of an organ localization system.

FIG. 1 is a schematic diagram of a medical image organ localization system comprising a computing device 102 on which is executed an organ localization engine 104. In an example, a user 106 (for example a doctor) may wish to examine medical images of a patient by viewing certain anatomical structures such as organs. However, as noted above, a significant amount of time can be spent by the user simply localizing the anatomical structure of interest in the image, before diagnosis or further analysis can be performed. The organ localization engine 104 implements an efficient and accurate technique for determining the localization of anatomical structures such as organs, allowing them to be rapidly found in the medical image, as described in more detail below.

The computing device 102 is arranged to receive a medical image of two or higher dimensions generated by a scanner, such as CT scanner 108. The medical image is processed by the organ localization engine 104, which is arranged to detect and localize anatomical structures, as described below. The organ localization engine 104 performs the localization by accessing and using a trained regression forest stored on a storage device 110. The process for training the regression forest to localize organs is described below with reference to FIG. 2.

A display device 112 (such as a computer monitor) is connected to the computing device 102 and is arranged to display a viewer user interface comprising a plurality of controls 114 and a display window 116. The viewer can use the results from the organ localization engine to control the display of the medical image shown in the display window 116. For example, the plurality of controls 114 can comprise buttons for each of the organs detected, such that when one of the buttons is selected the image shown in the display window 116 is automatically centered on the portion of the image comprising the selected organ.

For example, FIG. 1 shows a 'right kidney' button 118, and when this is selected the image in the display window is centered on the right kidney. This enables a user to rapidly view the images of the kidney without spending the time to browse through the image to find the organ.

In the example of FIG. 1, the medical images are from a CT scanner 108. However, the images may be produced by many types of medical equipment such as magnetic resonance imaging (MRI) scanners, computed tomography (CT) scanners, single photon emission computed tomography (SPECT) scanners, positron emission tomography (PET) scanners and ultrasound scanners.

The organ localization techniques described below use machine learning techniques to learn from training data how to perform the localization task on previously unseen medical images. As noted above, this is achieved using a regression forest, which is an ensemble of distinct, trained regression trees. This provides an efficient algorithm for the accurate detection and localization of anatomical structures within medical scans, which negates the requirement for atlas registration. This therefore overcomes issues with atlas-based techniques related to a lack of atlases, selecting the optimal model for geometric registration, and robust registration between patient images and atlases.

In addition, the algorithm considers context-rich visual features which capture long-range spatial correlations efficiently. These techniques are computationally simple, and can be combined with an intrinsic parallelism to yield high computational efficiency. Furthermore, the algorithm produces probabilistic output, which enables tracking of uncertainty in the results, the consideration of prior information (e.g. about global location of organs) and the fusing of multiple sources of information (e.g. different acquisition modalities). The algorithm is able to work with different images of varying resolution, varying cropping, different patients (e.g. adult, child, male, female), different scanner types and settings, different pathologies, and contrast-agent enhanced and non-enhanced images.

Regression trees are binary trees comprising a plurality of interconnected nodes. Each node can have two child nodes (which can be denoted left and right, for example). The branches of the tree terminate with leaf nodes. When an input is provided to a node, a binary test is performed that determines whether the input is passed to the left or right child node. Therefore, an input to the tree is passed through the nodes, directed by the binary tests, until it reaches a leaf node. The structure of the tree and the tests performed are determined during a training process, and inferences can be made in dependence on the leaf node that an input reaches. In this example, the image elements of a medical image are passed through a regression tree in order to infer how the image element spatially relates to a certain organ.

Regression trees are an efficient way of mapping a complex input space to continuous output parameters. Highly non-linear mappings are handled by splitting the original problem into a set of smaller problems which can be addressed with simple regressors. Each node in the tree is designed to split the data so as to form clusters where accurate prediction can be performed with simpler models. Using more tree levels may yield more accurate fit of the regressed model. The leaf nodes store continuous parameters characterizing each regressor. The regressor may be linear, constant, polynomial, Gaussian, quadratic or any other functional form. In this way, complex non-linear mappings may be modeled via a hierarchical combination of many simple regressors. The tree based regressor allows multiple anatomical structures to be dealt with concurrently, which encourages feature sharing between anatomical structures and therefore improved generalization. For example, the presence of a lung may be indicative of the presence of the heart.

An ensemble of a plurality of randomly trained regression trees (a regression forest) yields improved generalization over a single tree which may suffer from over-fitting. Regression trees differ from classification trees in that they provide real valued continuous output as opposed to a class to which an object belongs. For example, classification trees can be used to allocate a discrete classification to each image element of a medical image, e.g. to indicate whether the image element belongs to a kidney, liver, heart, or background. Therefore, the output of a classification tree is a discrete classification. An example classification tree-based technique for organ classification can be seen in U.S. patent application Ser. No. 12/697,785. Conversely, the output of a regression tree is a continuous parameter. In this example, the regression trees are used to determine a spatial distance from each image element of a medical image to a certain organ. The distance from an image element to an organ is a continuous parameter (e.g. measured in millimeters). As outlined below, the estimation of distance in this way enables concurrent organ localization and extent estimation.

In the description below, firstly a process for training the regression trees is discussed with reference to FIGS. 2 to 5, and secondly a process for using the trained regression trees for localizing organs in a medical image is discussed with reference to FIG. 6.

Figure 2:
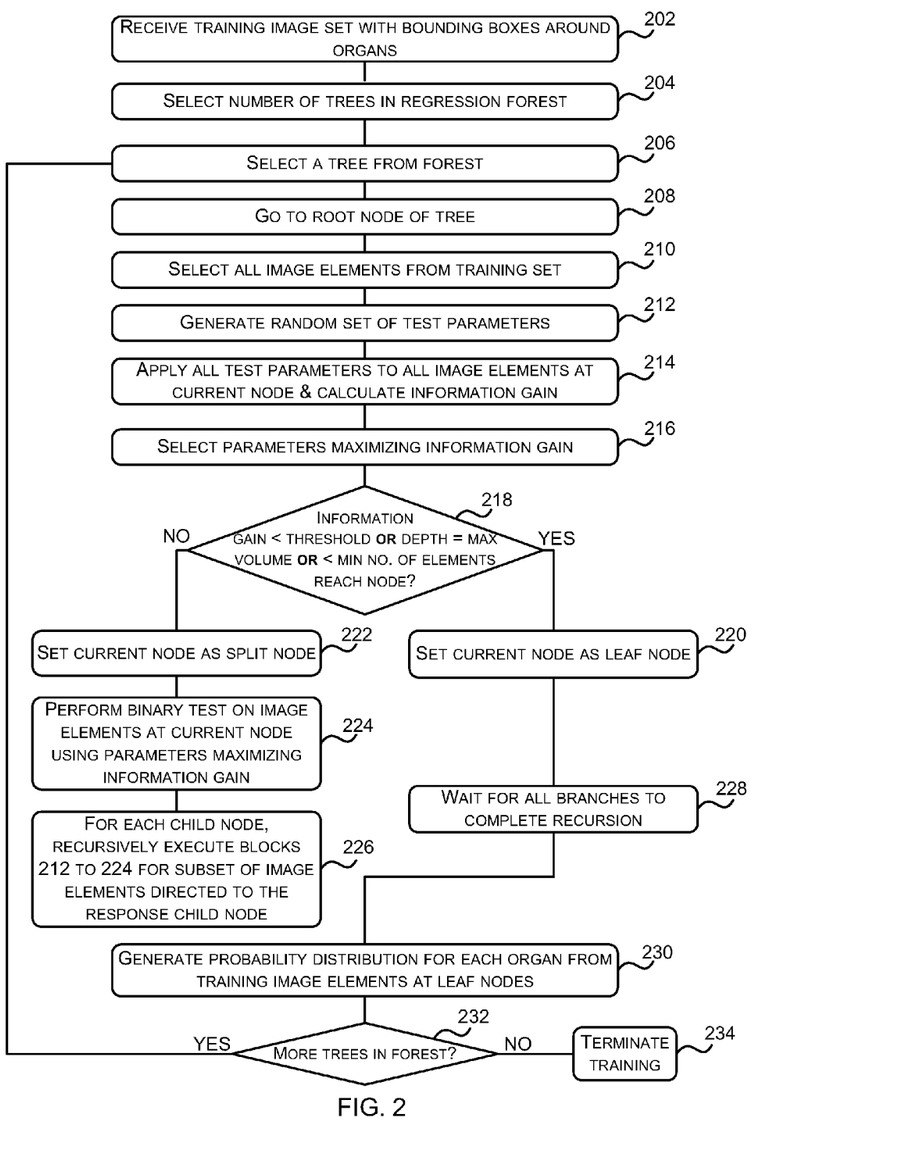
FIG. 2 illustrates a flowchart of a process for training a regression forest to localize organs.

Reference is now made to FIG. 2, which illustrates a flowchart of a process for training a regression forest to identify organs in an image. In an embodiment the anatomical structures which can be identified include but are not limited to $\mathcal{C}$ ={heart, liver, spleen, left lung, right lung, left kidney, right kidney, gall bladder, left pelvis, right pelvis}. FIG. 2 describes one example method of training a regression forest. Alternatively, other methods may be used such as breadth-first training where a whole level of the tree is trained at once.

Firstly, a set of training images are received 202 that have been annotated to include a predefined organ location, e.g. in the form of bounding boxes around the organs of interest. This training set can be obtained from a labeled ground-truth database. In one example, the training set can be created by taking a selection of training images, and hand-annotating them by drawing a bounding box (i.e. a cuboid in the case of a 3D image, and a rectangle in the case of a 2d image) closely surrounding each organ of interest (i.e. each organ that it is desired that the machine learning system can identify). The bounding boxes (2D or 3D) can also be extended in the temporal direction in the case of a sequence of images.

The bounding box for the organ $c \in \mathcal{C}$ is parameterized as a 6-vector $b_c = (b_c^L, b_c^R, b_c^A, b_c^P, b_c^H, b_c^F)$ where each component represents the position (e.g. in mm) of the corresponding axis-aligned wall of the bounding box. The superscripts follow standard radiological orientation convention: L=left, R=right, A=anterior, P=posterior, H=head, F=foot.

The training images can comprise both contrasted and non-contrasted scan data, and images from different patients, cropped in different ways, with different resolutions and acquired from different scanners. The training set can be generated using a dedicated annotation tool, which is a software program enabling fast drawing of the bounding boxes from different views of the image (e.g. axial, coronal, sagittal and 3D views). As the drawing of a bounding box is a simple operation, this can be efficiently manually performed. In some examples, radiologists can be used to validate that the labeling is anatomically correct.

Figure 3:
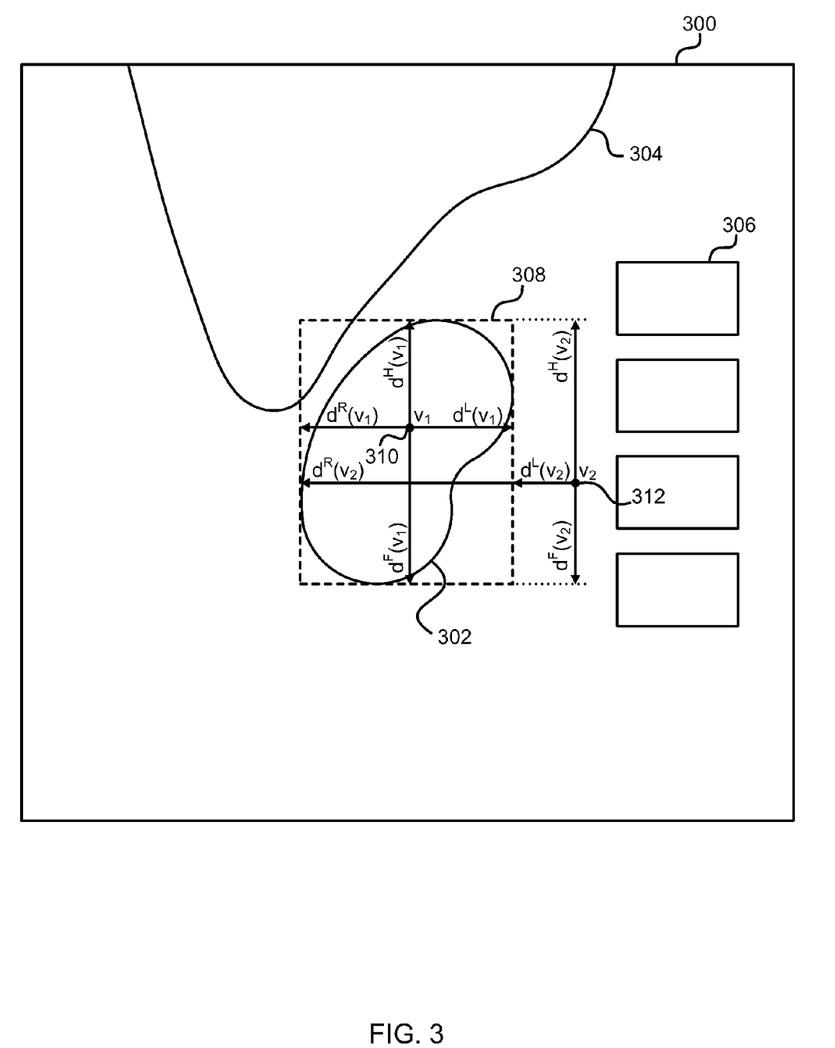
FIG. 3 illustrates an example training medical image.

An example training image is illustrated with reference to the simplified schematic diagram of FIG. 3, representing a portion of a medical image 300. Note that the schematic diagram of FIG. 3 is shown in two dimensions only, for clarity, whereas an example volumetric image is three-dimensional. The medical image 300 comprises a representation of several organs, including a kidney 302, liver 304 and spinal column 306, but these are only examples used for the purposes of illustration. Other typical organs that can be shown in images and identified using the technique described herein include (but are not limited to) the head, heart, eyes, lungs, and major blood vessels. A bounding box 308 is shown drawn (in dashed lines) closely around the kidney 302. Note that in the illustration of FIG. 3 the bounding box 308 is only shown in two dimensions, whereas in a volumetric image the bounding box 308 surrounds the kidney 302 in three dimensions. Similar bounding boxes to that shown in FIG. 3 are drawn around each organ of interest in each of the training images.

The purpose of training the regression trees is to enable them to estimate the location of the bounding box of an organ in a previously unseen image. In other words, the regression trees are trained to predict the position and shape of bounding boxes of the type that are included in the training images. In this example, the continuous output of the regression trees is used to estimate the position of the walls of the bounding box containing each organ, thus achieving both organ localization and extent estimation, as described in more detail below.

Returning again to FIG. 2, the number of regression trees to be used in a random regression forest is selected 204. A random regression forest is a collection of deterministic regression trees. An ensemble of many randomly trained regression trees yields improved generalization and reduces over-fitting compared to the use of individual trees. During the training process, the number of trees is fixed. In one example, the number of trees is ten, although other values can also be used.

The following notation is used to describe the training process for a 3D volumetric image. Similar notation is used for a 2D image, except that the pixels only have x and y coordinates. An image element in a image V is defined by its coordinates v=(x,y,z). The forest is composed of T trees denoted $\Psi_1, \ldots, \Psi_t, \ldots, \Psi_T$ with t indexing each tree. An example random regression forest is shown illustrated in FIG. 4. The illustrative regression forest of FIG. 4 comprises three regression trees: a first tree 400 (denoted tree $\Psi_1$); a second tree 402 (denoted tree $\Psi_2$); and a third tree 404 (denoted tree $\Psi_3$). Each regression tree comprises a root node (e.g. root node 406 of the first regression tree 400), a plurality of internal nodes, called split nodes (e.g. split node 408 of the first regression tree 400), and a plurality of leaf nodes (e.g. leaf node 410 of the first regression tree 400). Each branch of the tree terminates at a leaf node.

In operation, each root and split node of each tree performs a binary test on the input data and based on the result directs the data to the left or right child node. The leaf nodes do not perform any action; they just store probability distributions (e.g. example probability distribution 412 and probability distribution 414 for two leaf nodes of the first regression tree 400 of FIG. 4), as described hereinafter.

Figure 4:
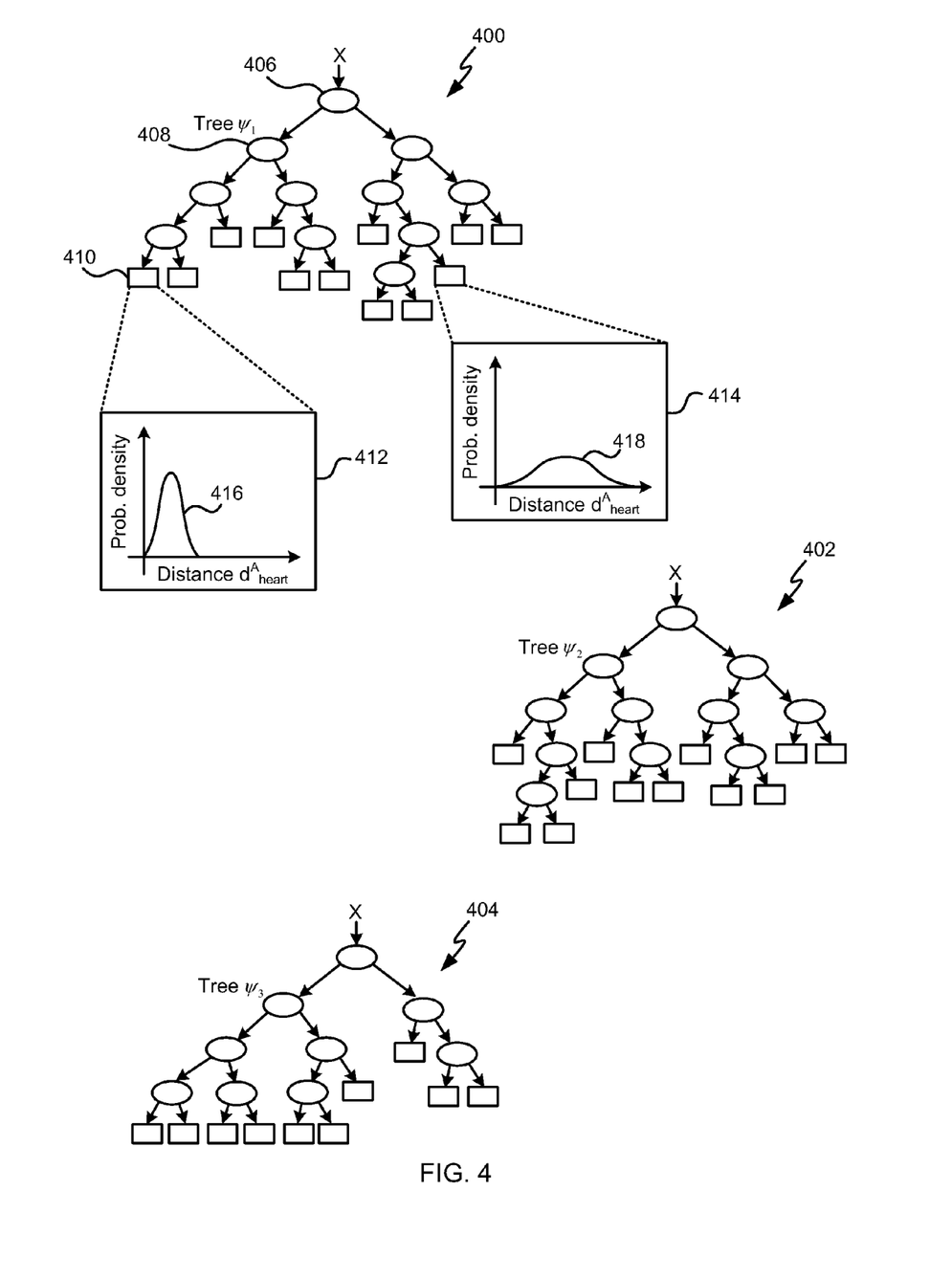
FIG. 4 illustrates an example spatial offset test performed on an image element in the training medical image.

The manner in which the parameters used by each of the split nodes are chosen and how the leaf node probability distributions are computed is now described. A regression tree from the regression forest is selected 206 (e.g. the first regression tree 400) and the root node 406 is selected 208. All image elements from each of the training images are then selected 210.

A random set of test parameters are then generated 212 for use by the binary test performed at the root node 406. In one example, the binary test is of the form: $\xi_j > f(v; \theta_k) > \tau_j$, such that $f(v; \theta_j)$ is a function applied at the $j^{th}$ node of the tree to image element v with parameters $\theta_j$, and with the output of the function compared to threshold values $\xi_j$ and $\tau_j$. If the result of $f(v; \theta_j)$ is in the range between $\xi_j$ and $\tau_j$ then the comparison result (i.e. the result of the binary test) is true. Otherwise, the result of the binary test is false. In other examples, only one of the threshold values $\xi_j$ and $\tau_j$ can be used, such that the result of the binary test is true if the result of $f(v; \theta_j)$ is greater than (or alternatively less than) a threshold value. An equivalent effect to having only one threshold can also be achieved by setting $\xi_j$ to $+\infty$ or $\tau_j - \infty$. In the example described here, the parameter $\theta_j$ defines a visual feature of the image.

An example function $f(v; \theta_j)$ is now described with reference to FIG. 5. Anatomical structures can be difficult to identify in medical images because different organs can share similar intensity values, e.g. similar tissue density in the case of CT and X-Ray scans. Thus, local intensity information is not necessarily sufficiently discriminative to identify organs. To avoid this, long-range spatial contexts are used in the test function.

The process for generating the parameters $\theta_j$ comprises generating, for example, a randomly-sized box (a cuboid box for 3D images, or a rectangle for 2D images, both of which can be extended in the time-dimension in the case of a sequence of images) and a spatial offset value. All dimensions of the box are randomly generated. The spatial offset value is in the form of a two- or three-dimensional displacement. Given the above parameters $\theta_j$, the result of the function $f(v; \theta_j)$ is computed by aligning the randomly generated box with the image element of interest v such that the box is displaced from the image element v in the image by the spatial offset value.

Figure 5:
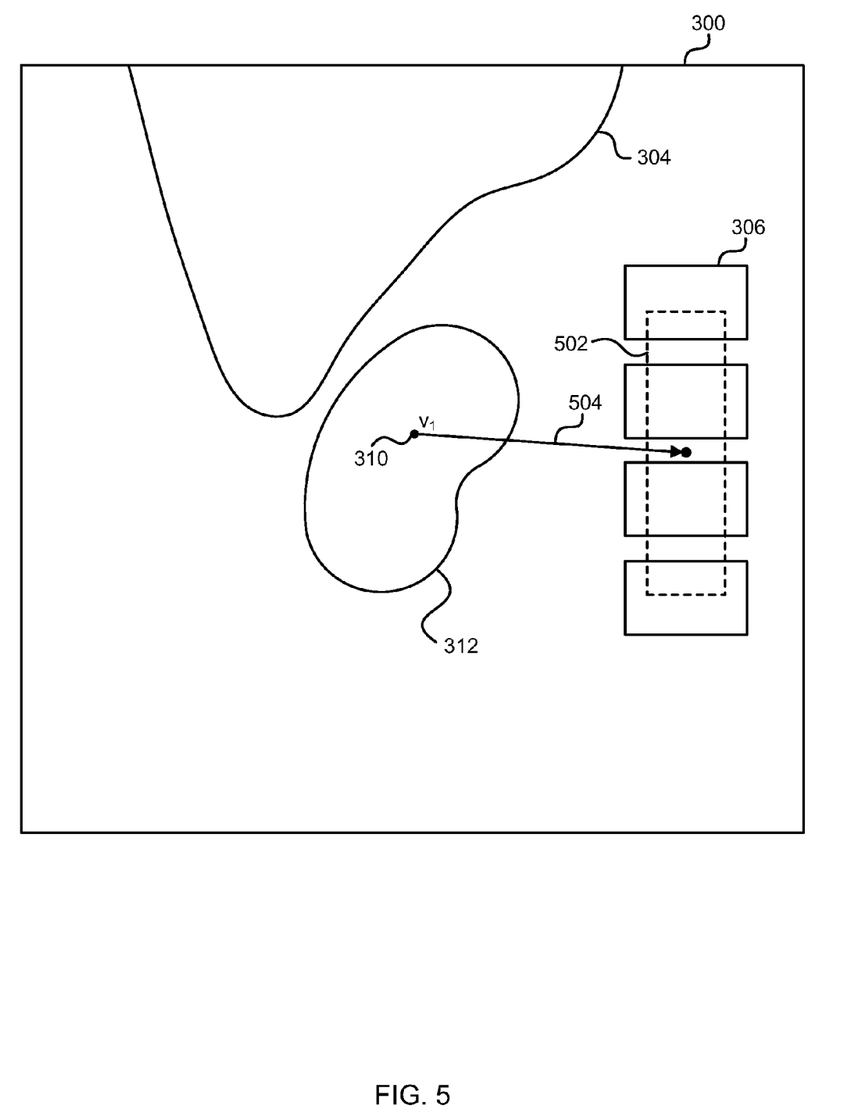
FIG. 5 illustrates an example trained regression forest.

FIG. 5 shows an example of a box and spatial offset for an image element $v_1$ 310. Note that the image in FIG. 5 is two-dimensional for clarity reasons only, and that in a 3D volumetric image example, the box is cuboid and the spatial offsets have three dimensions. The image of FIG. 5 shows a coronal view of a patient's abdomen, showing a kidney 302, liver 304 and spinal column 306, as described above with reference to FIG. 3. A set of parameters $\theta_j$ have been randomly generated that comprise the dimensions of a box 502, along with a spatial offset 504. FIG. 5 shows the box 502 positioned displaced from the image element $v_1$ 310 by the offset 504

The result of $f(v; \theta_j)$ is then found by summing the values from the image elements encompassed by the displaced box (e.g. summing the intensity values for the image elements in the box). Therefore, for the case of a single box, this is determined by $f(v; \theta_j) = \Sigma_{q \in F} I(q)$, where q is an image element within a box F, and $I(q)$ is the intensity of image element q. This summation is normalized by the number of pixels in the box, $|F|$, after a physical pixel resolution adaptation has been applied. This avoids different summations being obtained from volumes recorded at different resolutions. This gives:

$$f(v; \theta_j) = \frac{1}{|F|} \sum_{q \in F} I(q)$$

In other examples, the parameters $\theta_j$ can further comprise one or more additional randomly generated boxes and spatial offset values. In alternative examples, differently shaped regions (other than boxes) or offset points can be used. In an example, only a single image element value (e.g. intensity only) is used for all boxes. In other examples the image element value may be the magnitude of the intensity gradient or a more complex filter can be used. For example, in the case that two boxes are randomly generated as part of the test parameters, $f(v; \theta_j)$ is given by:

$$f(v; \theta_j) = \frac{1}{|F_1|} \sum_{q \in F_1} I(q) - \frac{1}{|F_2|} \sum_{q \in F_2} I(q)$$

Where $F_1$ is the first box, and $F_2$ is a second box. In other examples, $F_2$ may be an empty set for unary features. Again, these two summations are normalized separately by the respective number of image elements in each box.

Such long-range spatial features, defined by boxes and offsets allow the training algorithm to learn discriminative features that assist in localizing organs, and encode these into the regression trees. For example, in the case of FIG. 5, the training algorithm can learn that when the image element $v_1$ is in the kidney 302, the combination of box 502 and offset 504 is largely in a region of high density (the spine). Thus the value of $f(v; \theta_j)$ is high for those points. During training the algorithm learns that box 502 and offset 504 is discriminative for the position of the right kidney when associated with a high, positive value of the threshold $\xi_j$ (with $\tau_j = -\infty$).

The result of the binary test $\xi_j > f(v; \theta_j) > \tau_j$ performed at a root node or split node determines which child node an image element is passed to. For example, if the result of the binary test is true, the image element is passed to a first child node, whereas if the result is false, the image element is passed to a second child node.

The random set of test parameters generated comprise a plurality of random values for the function parameter $\theta_j$ and the threshold values $\xi_j$ and $\tau_j$. In order to inject randomness into the regression trees, the function parameters $\theta_j$ of each split node are optimized only over a randomly sampled subset $\Theta$ of all possible parameters. For example, the size of the subset $\Theta$ can be five hundred. This is an effective and simple way of injecting randomness into the trees, and increases generalization.

Returning to FIG. 2, every combination of test parameter is applied 214 to each image element in the training images. In other words, all available values for $\theta_j$ (i.e. $\theta_j \in \Theta$) are tried one after the other, in combination with all available values of $\xi_j$ and $\tau_j$ for each image element in each training image. For each combination, the information gain is calculated.

The information gain for an image element is calculated using an offset (i.e. distance) from the image element to the bounding box of each organ. More formally, each image element v in the training volume can be associated with an offset $d_c(v) = (d_c^L, d_c^R, d_c^A, d_c^P, d_c^H, d_c^F) \in \mathbb{R}^6$ along the six predefined axes with respect to the bounding box $b_c$ for each organ class $c \in \mathcal{C}$. The offsets are calculated from the image element to the corresponding wall of the bounding box associated with each of the coordinate axes. Examples of offsets are shown in FIG. 3 for two image elements $v_1$ 310, and $v_2$ 312, from bounding box 308 surrounding kidney 302. The offset for $v_1$ 310 is given by $d(v_1) = (d_1^L, d_1^R, d_1^H, d_1^F)$ and for $v_2$ 312 is given by $d(v_2) = (d_2^L, d_2^R, d_2^H, d_2^F)$. The other two components of the offset vectors $(d_1^A, d_1^P)$ and $(d_2^A, d_2^P)$ which would be present in a 3-D volumetric image are not shown in the two dimensional representation in FIG. 3. Given the above offset vector, the absolute location of the bounding box for an organ c (i.e. not relative to the image element location) can be found from $b_c(v) = \hat{v} - d_c(v)$ and $\hat{v} = (v_x, v_x, v_y, v_y, v_z, v_z)$.

An example information gain measure can then be calculated from: $IG = H(S) - \Sigma_{i=\{L,R\}} \omega_i H(S_i)$, where H denotes entropy, S is the set of training points reaching the node and L,R denote the subsequent left and right child nodes. To determine information gain for a regression forest, the "purity" of the probability density of the real valued predictions is measured (this is related to the confidence/uncertainty or "peakiness" of the distribution, as illustrated below). In order to determine the probability distribution at a node of the tree, for a given organ class c and function parameter $\theta_j$ and the threshold values $\xi_j$ and $\tau_j$, the offset vectors $d_c$ are found for all the training image elements that have reached this node. The distribution of the vectors $d_c$ reaching this node can then be modeled as a multivariate Gaussian having a plurality of dimensions that correspond to the number of walls of the bounding box and hence offsets (e.g. six for a volumetric image, and four for a two-dimensional image). For example, $p(d_c) = \mathcal{N}(d_c; \bar{d}_c, \Lambda)$, with the matrix $\Lambda_c$ encoding the covariance of $d_c$ for all image elements S at the node. In an alternative example, the distribution of vectors reaching a node can be modeled using a different distribution, such as Gaussian mixture model. In other examples the regression forest may alternatively be used with a non-parametric distribution.

The differential entropy of a multivariate Gaussian can be shown to be:

$$H(\mathcal{S}) = \frac{n}{2}(1 + \log(2\pi)) + \frac{1}{2}\log|\Lambda_c(\mathcal{S})|$$

Where n is the number of dimensions. In examples where the images are volumetric images n=6, and in examples where two dimensional images n=4. However, n may take any appropriate value. Using algebraic manipulation, the regression information gain can then be expressed as:

$$IG = \log|\Lambda_c(\mathcal{S})| - \sum_{i=\{L,R\}} \omega_i \log|\Lambda_c(\mathcal{S}_i)|$$

Therefore, in general, the information gain is calculated using covariance values derived from distances between the image elements at the node and the organ location, and covariance values derived from distances between the image elements at the subsequent nodes and the organ location. In examples where the organ localization system is adapted to handle multiple organ classes, the information gain can be adapted to be:

$$IG = \sum_{c \in \mathcal{C}} \left( \log|\Lambda_c(\mathcal{S})| - \sum_{i=\{L,R\}} \omega_i \log|\Lambda_c(\mathcal{S}_i)| \right)$$

This can be rewritten as:

$$IG = \log|\Gamma_c(\mathcal{S})| - \sum_{i=\{L,R\}} \omega_i \log|\Gamma(\mathcal{S}_i)| \quad (1)$$

with $\Gamma = \text{diag}(\Lambda_1, \ldots, \Lambda_c, \ldots, \Lambda_{|c|})$ For a 3D image, maximizing eqn. (1) minimizes the determinant of a $6|\mathcal{C}| \times 6|\mathcal{C}|$ covariant matrix $\Gamma$ (note that $|\mathcal{C}|$ is the number of organ classes that can be localized) thus decreasing the uncertainty in the probabilistic vote cast by each cluster of voxels on each organ location and pose. As an alternative to information gain other criteria can be used, such as Gini entropy or 'two-ing' criterion.

Returning to FIG. 2, once the information gain has been calculated for every combination of function parameter $\theta_j$ and threshold values $\xi_j$ and $\tau_j$, for all the training image elements, the combination of parameters that maximize the information gain (denoted $\theta^*_j, \xi^*_j, \tau^*_j$) is selected 216 and stored at the current node for future use.

It is then determined 218 whether the value for the maximized information gain is less than a threshold. If the value for the information gain is less than the threshold, then this indicates that further expansion of the tree does not provide significant benefit. This gives rise to asymmetrical trees which naturally stop growing when no further nodes are beneficial. In such cases, the current node is set 220 as a leaf node. Similarly, the current depth of the tree is determined 218 (i.e. how many levels of nodes are between the root node and the current node). If this is greater than a predefined maximum value, then the current node is set 220 as a leaf node. In one example, the maximum tree depth can be set to 7 levels, although other values can also be used. Furthermore, the number of image elements reaching the node is determined 218. If this is less than a predefined threshold value, then the current node is set 220 as a leaf node. Note that these three factors for stopping growth of the tree can also be used alone or in any combination.

In this example, if the value for the maximized information gain is greater than or equal to the threshold, the tree depth is less than the maximum value, and greater than the minimum number of image elements has reached the node, then the current node is set 222 as a split node. As the current node is a split node, it has child nodes, and the process then moves to training these child nodes. Each child node is trained using a subset of the training image elements at the current node. The subset of image elements sent to a child node is determined using the parameters $\theta^*_j, \xi^*_j, \tau^*_j$ that maximized the information gain. These parameters are used in the binary test, and the binary test performed 224 on all image elements at the current node. The image elements that pass the binary test form a first subset sent to a first child node, and the image elements that fail the binary test form a second subset sent to a second child node.

For each of the child nodes, the process as outlined in blocks 212 to 224 of FIG. 1 are recursively executed 226 for the subset of image elements directed to the respective child node. In other words, for each child node, new random test parameters are generated 212, applied 214 to the respective subset of image elements, parameters maximizing the information gain selected 216, and the type of node (split or leaf) determined 218. If it is a leaf node, then the current branch of recursion ceases. If it is a split node, binary tests are performed 224 to determine further subsets of image elements and another branch of recursion starts. Therefore, this process recursively moves through the tree, training each node until leaf nodes are reached at each branch. As leaf nodes are reached, the process waits 228 until the nodes in all branches have been trained. Note that, in other examples, the same functionality can be attained using alternative techniques to recursion.

Once all the nodes in the tree have been trained to determine the parameters for the binary test maximizing the information gain at each split node, and leaf nodes have been selected to terminate each branch, then probability distributions can be generated 230 for all the leaf nodes of the tree.

The probability distributions generated 230 for each leaf node of the tree are based on the distribution of the distance from each image element reaching that leaf node to an organ location. To generate the probability distributions at the leaf nodes, the offset vectors $d_c$ are retrieved for all the training image elements that have reached this leaf node. The distribution of the vectors $d_c$ reaching this node can then be modeled as a multivariate Gaussian, Gaussian mixture model, or other distribution. For example, in the case of a multivariate Gaussian distribution, $p(d_c) = \mathcal{N}(d_c; \bar{d}_c, \Lambda_c)$ with the matrix $\Lambda_c$ encoding the covariance of $d_c$. In other words, the mean and variance of each of the individual offset values (to each bounding box wall for an organ c) are found from all the image elements at the leaf node, and these are combined and modeled as a multivariate Gaussian distribution. For each leaf node the associated learned mean $\bar{d}$ (with $\bar{d}=(\bar{d}_1, \ldots, \bar{d}_c, \ldots, \bar{d}_{|C|})$ and covariance matrix $\Gamma$ is stored on a storage device.

An example first probability distribution 412 is shown illustrated in FIG. 4 for leaf node 410. The probability distribution shows the probability distribution function 416 for only a single offset value for the anterior offset from the heart bounding box wall, for clarity. Such a probability distribution can therefore be used to determine the likelihood of an image element reaching that leaf node being offset by a certain distance along the anterior axis from the heart, as described in more detail hereinafter. Similar distributions are also generated for the other axes and combined in the overall multivariate distribution.

Similarly, FIG. 4 also shows a second probability distribution 414 for a different leaf node. This second probability distribution 414 shows the probability for the same offset value for the anterior offset from the heart. However, in this case, it can be seen that the probability distribution function 418 does not predict the bounding box location with as high a confidence as the first probability distribution 412. This can be seen visually from the wider probability distribution function 418, indicating a larger variance. Therefore, the first probability distribution 412 can be considered to provide a higher confidence, due to its "peakier" distribution.

Returning to FIG. 2, once the probability distributions have been determined for the leaf nodes of the tree, then it is determined 232 whether more trees are present in the regression forest. If so, then the next tree in the regression forest is selected, and the process repeats. If all the trees in the forest have been trained, and no others remain, then the training process is complete and the process terminates 234.

Therefore, as a result of the training process, a plurality of regression trees are trained using training images. Each tree comprises a plurality of split nodes storing optimized test parameters, and leaf nodes storing associated probability distributions. Due to the random generation of parameters from a limited subset used at each node, the trees of the forest are distinct (i.e. different) from each other.

The use of the information gain determination in eqn. (1), is an example of a way of maximizing the confidence of the desired continuous output for all organs without intermediate image element classification. Furthermore, the example information gain formulation enables different context models to be used. For example imposing a full covariance r can allow correlations between all walls in all organs. In another example assuming a diagonal $\Gamma$ (and diagonal class covariances $\Lambda_c$) can lead to uncorrelated output predictions. In a further example $\Gamma$ can be sparse but correlations between selected subgroups of classes can be enabled to capture, for example, class hierarchies or other forms of spatial context.

Figure 6:
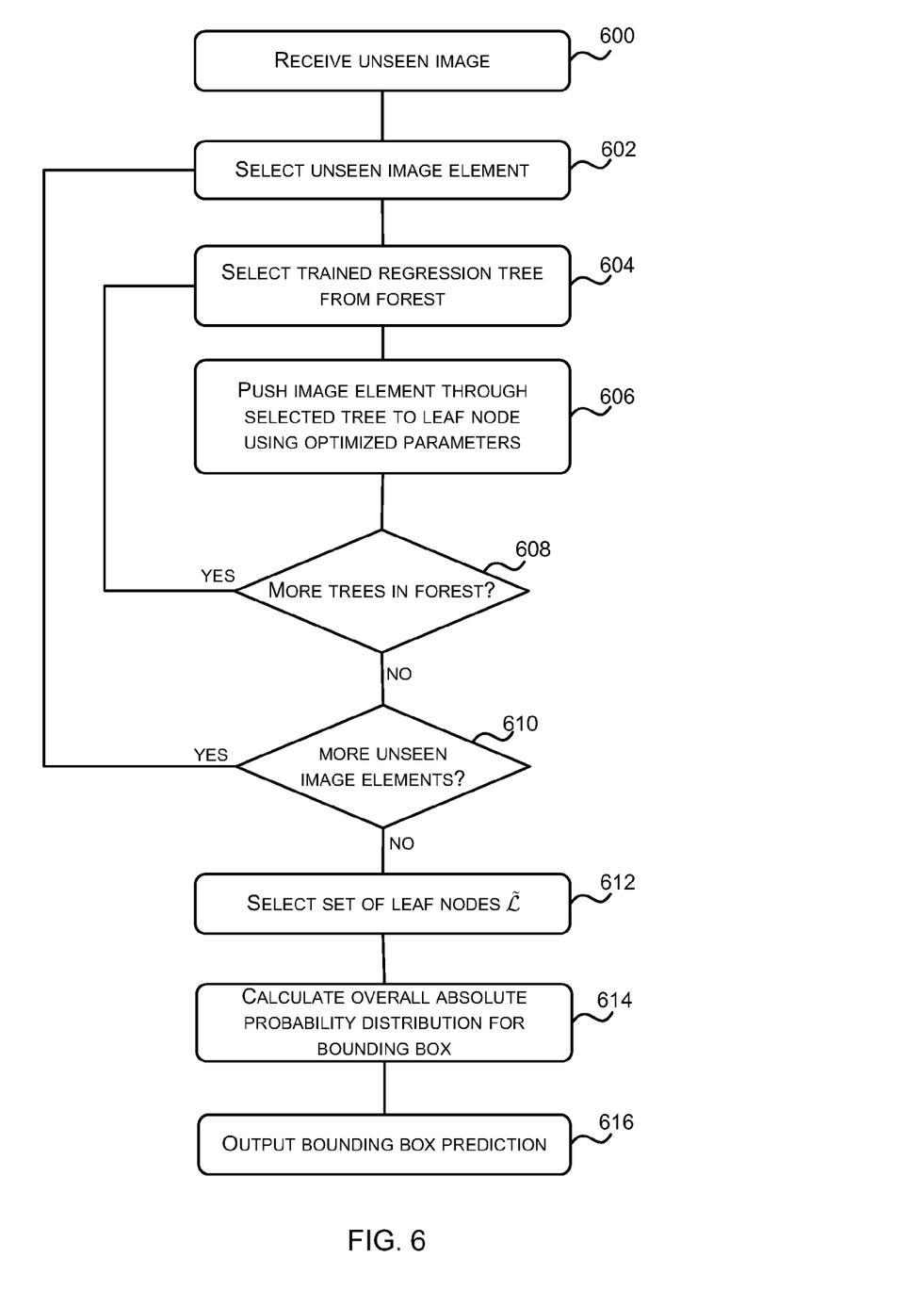
FIG. 6 illustrates a flowchart of a process for localizing an organ in an unseen medical image using a trained regression forest.

Reference is now made to FIG. 6 which illustrates a flow diagram of an example method of predicting organ locations in a previously unseen image. In an example a regression forest which has been trained as described above with reference to FIG. 2 is used. The flowchart of FIG. 6 is implemented in the organ localization engine 104 of FIG. 1. An unseen image is received 600 at the organ localization engine 104. An image is referred to as unseen to distinguish it from a training image which has the organ location and/or bounding box already identified.

An image element v from the unseen image V is selected 602 and a trained regression tree from the regression forest is also selected 604. The selected image element is pushed 606 through the selected regression tree such that it is tested against the trained binary test parameters $\theta^*_j, \xi^*_j, \tau^*_j$ at a node j and then passed to the appropriate child in dependence on the outcome of the test. In other words, the test $\xi^*_j > f(v; \theta^*_j) > \tau^*_j$ is performed at each node on the image element, and the result used to direct the image element to one or other child node. The process is repeated at each node until the image element reaches a leaf node, denoted l(v) with l indexing leaves across the whole forest.

If it is determined 608 that there are more regression trees in the forest, then a new regression tree is selected 604, the image element is pushed through the tree until a leaf node is reached. This is repeated until it has been performed for all the regression trees in the forest. In an example an image element can be pushed through the plurality of trees in the regression forest in parallel, rather than in sequence as shown in FIG. 6. It is determined 610 whether further unanalyzed image elements are present in the unseen image, and if so another image element is selected and the process repeated. In an example the process can be repeated for every image element in the image, i.e. v∈V. Therefore, each image elements in the medical image is applied to the regression trees. In another example, only some of the image elements are pushed through the trees.

As noted above, each leaf node of each tree is associated with a probability distribution relating to the distance from image elements reaching that leaf node to an organ of interest. This leaf node probability distribution is defined by a stored mean offset to the bounding box walls of each organ c, denoted $\bar{d}_c$, and a covariance matrix $\Lambda_c$ for offsets from the organ. In one example, a subset of the leaf nodes, denoted $\tilde{\mathcal{L}}$, can be selected 612 for further analysis. For example, $\tilde{\mathcal{L}}$ can be selected based on the confidence of prediction at a given leaf node, derived from the covariance matrix $\Lambda_c$. For example, the set of leaf nodes which has the smallest uncertainty (for each class c) can be selected. In another example, $\tilde{\mathcal{L}}$ can be selected based on the proportion of image elements reaching a given leaf node, e.g. such that those leaf nodes that contain at least a specified threshold level of all unseen image elements are selected. In an example the specified threshold level is 1% of the unseen image elements. In further examples, these selection criteria can also be combined in any way. In alternative examples, all leaf nodes can be considered instead of a subset.

Using the selected subset of leaf nodes $\tilde{\mathcal{L}}$ an overall estimate for the probability distribution of the bounding box location for an organ in the unseen image can then be calculated 614. This can be a multivariate Gaussian distribution, a Gaussian mixture model, or any other suitable distribution. For example, in the case of a multivariate Gaussian distribution, for each of the selected leaf nodes l∈$\tilde{\mathcal{L}}$, a multivariate Gaussian probability distribution for the bounding box wall offsets can be defined as $p(d_c|l) = \mathcal{N}(d_c; \bar{d}_c, \Lambda_c)$. Given the probability distribution for the offsets and the image elements reaching leaf node l, a probability distribution for the absolute bounding box location can then be given by $p(b_c|l) = \mathcal{N}(b_c; \bar{b}_c, \Lambda_c)$, which converts the bounding box offset location to an absolute location using $\bar{b}_c(v) = \hat{v} - \bar{d}_c(v)$, where $\hat{v} = (v_x, v_x, v_y, v_y, v_z, v_z)$.

The overall probability distribution for the bounding box location $b_c$ of an organ c can be computed by aggregating over all leaf nodes in the subset $\tilde{\mathcal{L}}$ by:

$$p(b_c) = \sum_{l \in \tilde{\mathcal{L}}} p(b_c \mid l) p(l)$$

Where $p(l)=1/|\tilde{\mathcal{L}}|$ if $l \in \tilde{\mathcal{L}}$ (and zero otherwise), irrespective of where in the forest the leaf node comes from.

A localization estimate for the organ in an unseen image, in the form of a prediction for the bounding box location for the organ can then be determined and output 616. The prediction for the absolute bounding box location for an organ c can be calculated from the expectation, given by:

$$\tilde{b}_c = \int_{b_c} b_c p(b_c) db_c.$$

The prediction for the bounding box location can then be used to locate the organ in an image, e.g. when using the viewer user interface of FIG. 1. The bounding box can also be used to estimate the extent of the organ, as well as its location. Furthermore, in another example, an organ can be declared to be present in an image if the probability of the expected location is greater than a threshold, i.e. $p(b_c = \tilde{b}_c) > \beta$. In one example $\beta=0.5$, however any threshold value may be used. In another example, the presence of an organ can be detected by determining the maximum probability in the overall probability distribution.

In a further example, the trained regression trees can also be used to determine anatomical "landmarks", which correspond to regions in the medical images that provide a high level of confidence when localizing an organ. From a trained regression tree, a set of leaf nodes having the highest confidence for predicting an organ of interest are selected. For example, the two leaf nodes having the highest confidence can be selected, although other values can also be used. Then, one or more split nodes in the tree immediately preceding these leaf nodes are selected. For example, the two closest split nodes in the tree to each selected leaf node can be selected, although alternative numbers can also be used. The feature boxes, defined by the parameter θ (i.e. the box and offset as described with reference to FIG. 5, above) for these split nodes are retrieved.

The "landmarks" are then found by pushing one or more images through the tree and overlaying the feature boxes retrieved onto the image, using the image elements that reach the selected leaf nodes as reference points. This visually highlights discriminative features in the image that are useful for predicting a certain organ's location. For example, it may be found that the bottom of the left lung and the top of the pelvis is used to localize the right kidney. These landmarks have been found automatically, without the use of a ground-truth database or manual tagging.

Compared to atlas based techniques the examples methods described herein have a reduced error, and are comparably fast and more robust when computing bounding box predictions. In addition, regression forest based techniques require significantly less memory than atlas based techniques. A regression based approach can compute the position of each wall rather than just the organ centre, thus enabling approximate extent estimation. Regression techniques as described in the examples herein are also more accurate than classification based approaches.

Figure 7:
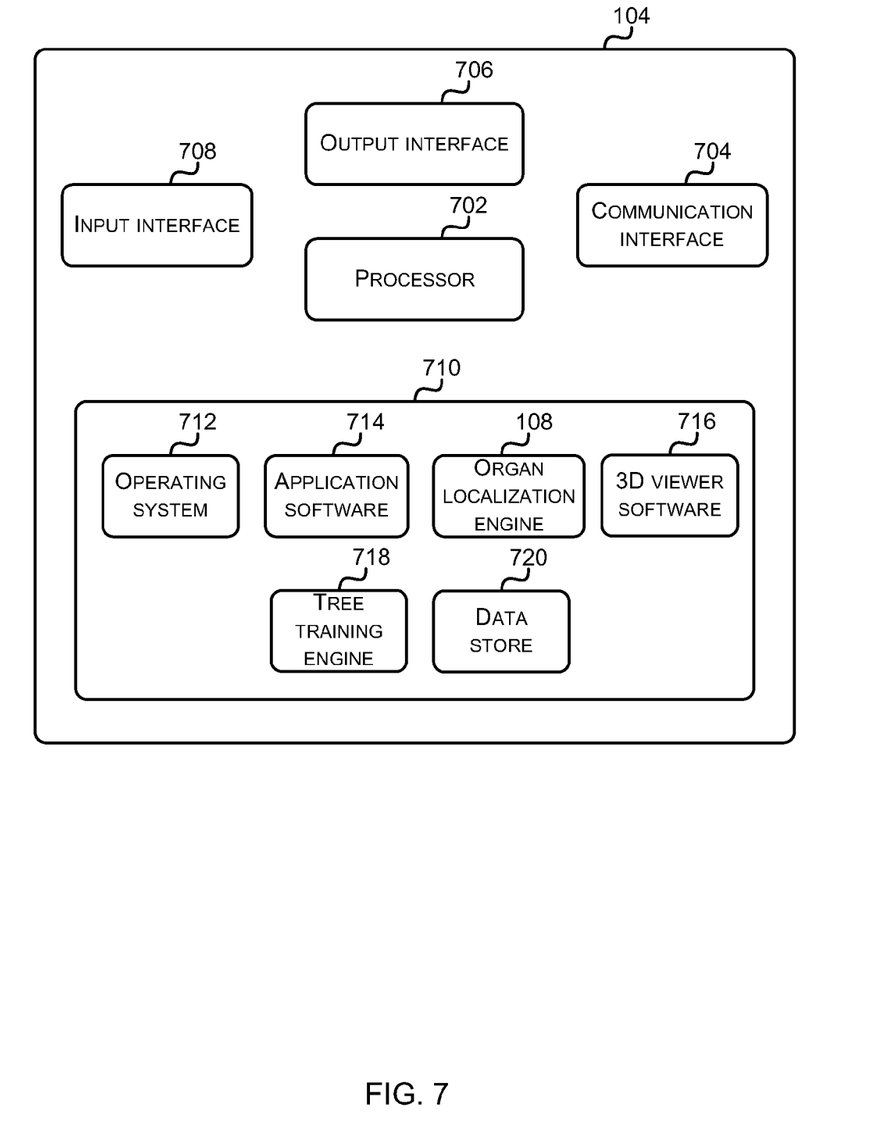
FIG. 7 illustrates an exemplary computing-based device in which embodiments of the automatic organ localization technique may be implemented.

FIG. 7 illustrates various components of an exemplary computing device 102 (such as that in FIG. 1) which may be implemented as any form of a computing and/or electronic device, and in which embodiments of the above-described organ localization techniques may be implemented.

Computing device 102 comprises one or more processors 702 which may be microprocessors, controllers or any other suitable type of processors for receiving the medical images and processing computing executable instructions to control the operation of the device in order to perform organ localization. In some examples, for example where a system on a chip architecture is used, the processors 702 may include one or more fixed function blocks (also referred to as accelerators) which implement a part of the organ localization methods in hardware (rather than software or firmware).

A communication interface 704 may be provided, which can be arranged to communicate with one or more communication networks (e.g. the internet). The communication interface 704 can be arranged to receive the medical images, e.g. from CT scanner 108 and provide them to the processors 702.

An output interface 706 is also provided and arranged to provide output to, for example, a display system integral with or in communication with the computing-based device (such as display device 112 in FIG. 1). The display system may provide a graphical user interface (such as the viewer interface), or other user interface of any suitable type. The computing-based device 102 also comprises an input interface 708 arranged to receive input from one or more devices, such as input devices enabling the user 106 to interact with the viewer user interface.

The computer executable instructions may be provided using any computer-readable media that is accessible by computing based device 102. Computer-readable media may include, for example, computer storage media such as memory 710 and communications media. Computer storage media, such as memory 710, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (the memory 710) is shown within the computing-based device 102 it will be appreciated that the storage may be distributed or located remotely and accessed via a network or other communication link (e.g. using communication interface 704).

Platform software comprising an operating system 712 or any other suitable platform software may be provided at the computing-based device to enable application software 714 to be executed on the device. The memory 710 can store executable instructions to implement the functionality of the organ localization engine 104 (described with reference to FIG. 6), and 3D viewer software 716 to implement the organ viewer user interface (shown in FIG. 1). Optionally, the memory 710 can also store executable instructions to implement the functionality of a tree training engine 718 (described with reference to FIG. 2), although the tree training can also be performed on a separate computing device to the localization. The memory 710 can also provide a data store 720, which can be used to provide storage for data used by the processors 702 when performing the organ localization techniques, such as for storing the trained regression trees and parameters.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of localizing an organ in a medical image, comprising:
    receiving the medical image at a processor;
    accessing at least one trained regression tree stored on a storage device;
    applying each image element of the medical image to the at least one trained regression tree to compute at least one probability distribution for each image element relating to a distance from that image element to the organ, application of each image element to the at least one trained regression tree including the use of landmarks associated with split nodes of the at least one trained regression tree;
    selecting at least a subset of the probability distributions and aggregating these selected probability distributions to compute a localization estimate for the organ;
    displaying the medical image on a display device;
    receiving an input from a user selecting an organ from a list; and
    in response to the input from the user, displaying the organ centered in the display device.

2. A method according to claim 1, wherein the at least one probability distribution for each image element relates to a distance from that image element to a bounding box surrounding the organ.

3. A method according to claim 1, wherein the at least one probability distribution for each image element defines a probability for the distance between that image element and each wall of a bounding box surrounding the organ along predefined axes.

4. A method according to claim 3, wherein the probability distribution is a multivariate Gaussian distribution or Gaussian mixture model having a plurality of dimensions that correspond to the number of walls of the bounding box.

5. A method according to claim 1, wherein the medical image a three-dimensional volumetric image and the image element is a voxel.

6. A method according to claim 1, wherein the step of accessing at least one trained regression tree comprises accessing a regression forest comprising a plurality of distinct trained regression trees.

7. A method according to claim 1, wherein the step of applying each image element of the medical image to the or each trained regression tree comprises passing each image element through a plurality of nodes in the tree until a leaf node is reached, and wherein the at least one probability distribution for each image element is computed in dependence on the leaf node reached.

8. A method according to claim 7, wherein the step of selecting at least a subset of the probability distributions comprises at least one of:
- selecting the probability distributions in dependence on a confidence value for the probability distributions; and
- selecting the probability distributions in dependence on a proportion of image elements have reaching the leaf nodes.

9. A method according to claim 8, wherein each of the plurality of nodes in the tree performs a test to determine a subsequent node to which to send the image element.

10. A method according to claim 9, wherein the test utilizes predefined parameters determined during a training process.

11. A method according to claim 1, wherein the step of aggregating the selected probability distributions to compute a localization estimate for the organ comprises summing the selected probability distributions and determining an expectation value from the sum of the selected probability distributions.

12. A computer-implemented method of training a regression tree to localize an organ in a medical image, the method comprising:
- receiving at least one training medical image comprising a plurality of image elements and a predefined organ location;
- selecting a node of the regression tree and providing the plurality of image elements to the node;
- generating parameters defining a test performed on each image element at the node that determines which subsequent node of the tree each image element is passed to;
- repeating the step of generating parameters for each subsequent node until each image element reaches one of a plurality of leaf nodes of the regression tree;
- at each leaf node, generating a probability distribution based on a distance from each image element reaching that leaf node to the organ location;
- storing the probability distribution associated with each leaf node at a storage device;
- generating at least one landmark based on at least one feature box corresponding to at least one split node, the at least one split node preceding at least one leaf node;
- displaying the training medical image on a display device;
- receiving an input from a user selecting an organ from a list; and
- in response to the input from the user, displaying the organ centered in a display of the display device.

13. A method according to claim 12, wherein the distance from each image element reaching that leaf node to the organ location comprises a distance from each element to each wall of a bounding box surrounding the organ along predefined axes.

14. A method according to claim 12, wherein the step of generating a probability distribution comprises determining at least one mean and covariance value from the distances and modeling the probability distribution as a multivariate Gaussian distribution.

15. A method according to claim 12, wherein the step of generating parameters comprises:
- generating a plurality of spatial offsets and thresholds;
- analyzing the training medical image at a plurality of locations to obtain a plurality of values, wherein each location is offset from each image element at the node by a respective one of the spatial offsets;
- comparing each of the plurality of values to each of the thresholds to obtain a plurality of comparison results which determine which subsequent node of the tree each image element is passed to;
- selecting a chosen offset and chosen threshold in dependence on the comparison results; and
- storing the chosen offset and chosen threshold in association with the node at the storage device.

16. A method according to claim 13, wherein the step of selecting a chosen offset and chosen threshold comprises determining an information gain for each of the plurality of comparison results, and selecting the combination of spatial offset and threshold giving the maximum information gain.

17. A method according to claim 14, wherein the information gain is computed from a covariance derived from distances between the image elements at the node and the organ location, and a covariance derived from distances between the image elements at the subsequent nodes and the organ location.

18. A method according to claim 13, wherein the training medical image is a three-dimensional volumetric image, and the method further comprises the step of randomly generating a plurality of cuboid dimensions, wherein each location comprises a portion of the volumetric image encompassed by a cuboid having a respective one of the plurality of cuboid dimensions, and the step of analyzing comprises summing at least one image value from each image element in the cuboid at each location.

19. A device for automatically localizing an organ in a three-dimensional medical volumetric image, comprising:
- a communication interface arranged to receive the three-dimensional medical volumetric image;
- a storage device arranged to store regression forest comprising a plurality of distinct trained regression trees; and
- a processor arranged to: apply each voxel of the three-dimensional medical volumetric image to each trained regression tree to compute a plurality of probability distributions for each image element relating to a distance from that voxel to each wall of a three-dimensional bounding box surrounding the organ, application of each voxel to each trained regression tree including the use of landmarks associated with split nodes of the trained regression trees; select a subset of the probability distributions; aggregate these selected probability distributions to compute a localization estimate for the bounding box surrounding the organ; cause a display device to display the three-dimensional medical volumetric image, receive a selection from the user, the selection being of an organ from a list; and, in response to receiving the selection, display the organ centered in a predefined region of the display device.

20. A device according to claim 19, comprising a processor arranged to pass each image element of the medical image through a plurality of nodes in a trained regression tree until a leaf node is reached, and compute the plurality of probability distributions for each image element in dependence on the leaf node reached.

* * * * *